Sept. 22, 1970  C. P. CLAPP  3,529,338
METHOD OF MAKING A DISPENSING VALVE FOR
A PRESSURIZED CONTAINER
Original Filed Aug. 24, 1967  2 Sheets-Sheet 1
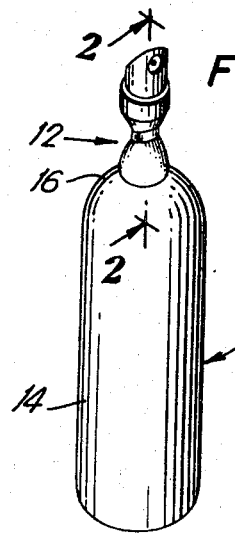
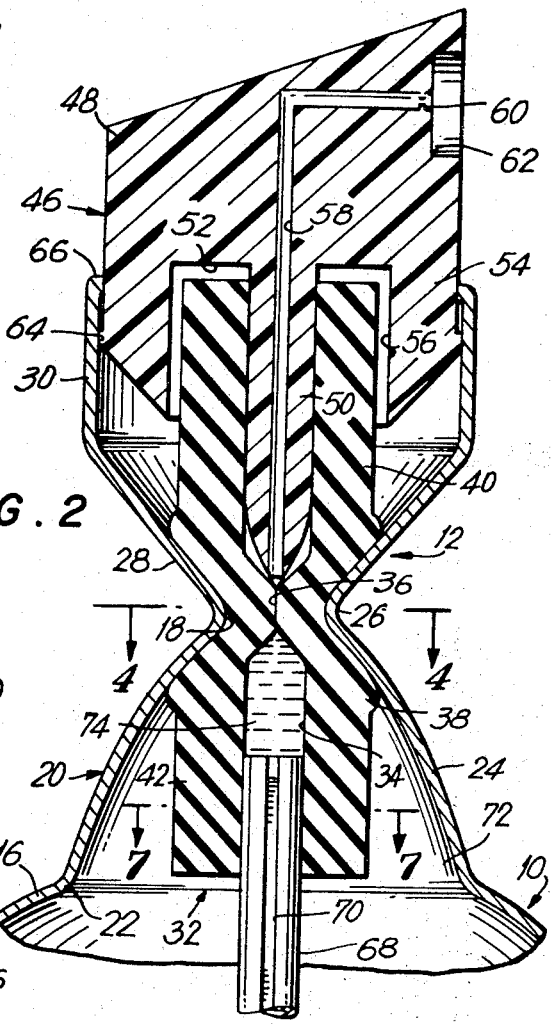
INVENTOR
CLARENCE P. CLAPP
KIRSCHSTEIN, KIRSCHSTEIN,
OTTINGER & FRANK
ATTORNEYS

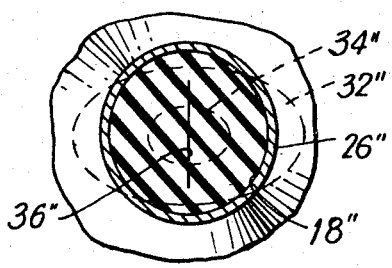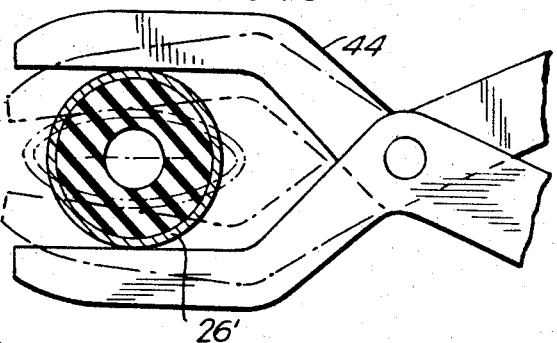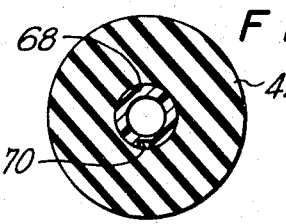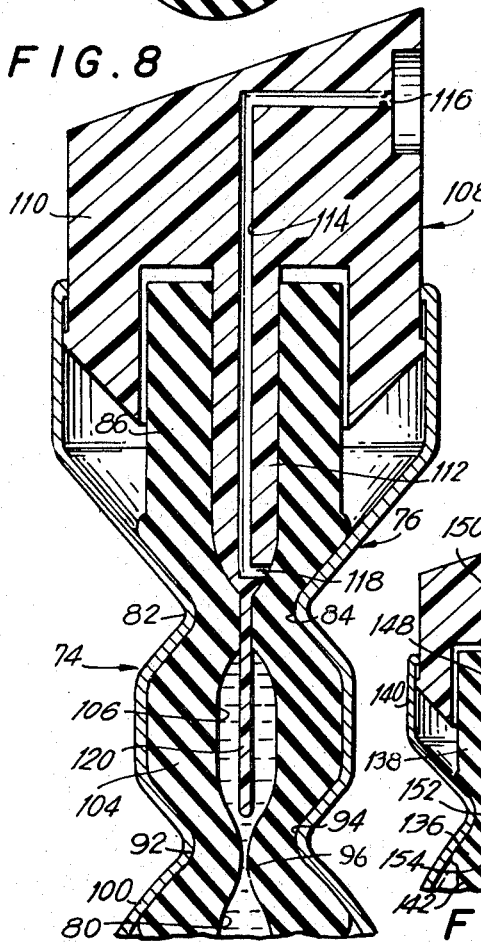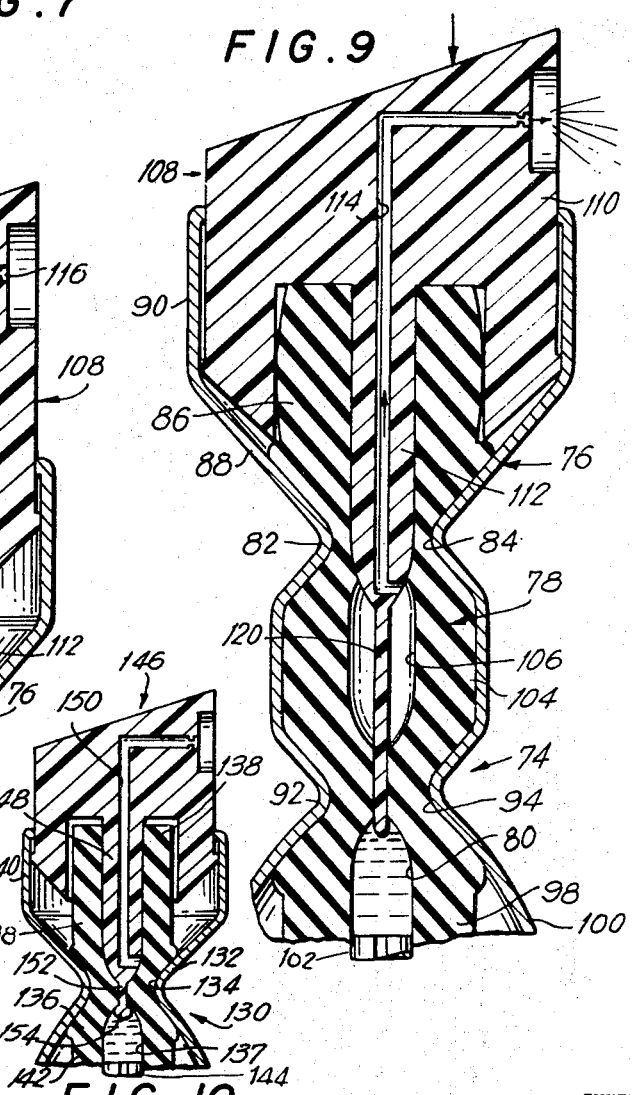
INVENTOR
CLARENCE P. CLAPP
KIRSCHSTEIN, KIRSCHSTEIN,
OTTINGER & FRANK
ATTORNEYS United States Patent Office 3,529,338
Patented Sept. 22, 1970

3,529,338
METHOD OF MAKING A DISPENSING VALVE FOR A PRESSURIZED CONTAINER
Clarence P. Clapp, Milford, Conn., assignor to Aerosol Techniques Research Center, Incorporated, Milford, Conn., a corporation of New York
Original application Aug. 24, 1967, Ser. No. 663,107, now Patent No. 3,437,246, dated Apr. 8, 1969. Divided and this application Aug. 12, 1968, Ser. No. 772,875
Int. Cl. B21d 53/00; B21k 29/00; B23p 15/26
U.S. Cl. 29—157.1      3 Claims

ABSTRACT OF THE DISCLOSURE

A dispensing valve for a container with pressurized contents. The valve is composed of a dispenser and an elastomeric tubing. The tubing has a passageway that is open when the tubing is unstressed. The container has an opening through which the tubing extends. The opening is so shaped and dimensioned with respect to the cross-section of the tubing that the opening laterally pinches the tubing to form an intermediate part of the passageway into a sealing slit. The dispenser has a tubular stem within the upper end of the tubing and a shoulder above said end. When the dispenser is depressed the tip of the stem penetrates the slit to permit discharge of the pressurized contents and the shoulder compresses the upper end of the tubing to establish a force biasing the dispenser to idle position.

---

This is a division of application Ser. No. 663,107 filed Aug. 24, 1967, now Pat. No. 3,437,246.

BACKGROUND OF THE INVENTION

Field of the invention

A pressurized container valve composed of an elastomeric member with a normally open passageway that intermediate its ends is closed to a sealing slit by a lateral pinching opening in the container. A tubular stem selectively penetrates the slit.

Description of the prior art

Present day commercial dispensing valves for pressurized containers have many disadvantages. For example, a valve of this type includes several parts of irregular configurations, such as a valve seat, a valve stem, a spring and a spout, each of which must be produced piece by piece, with consequent high cost of manufacture, handling and assembly. Furthermore, if tolerances, configurations and assembly are not closely controlled the number of valves that leak becomes unacceptably high.

It has been proposed to make valves of the character described, i.e., pressurized container valves, with rubber bodies having normally closed slits therethrough. To dispense the contents of the containers the walls of the slits were spread as by flexing of the bodies or insertion of tubes through the slits. The disadvantages of such valves were the high cost of manufacturing the slitted bodies, the continuing need for a separate opening and the continuing high cost of assembling several parts.

SUMMARY OF THE INVENTION

It is an object of the present invention to provide a pressurized container valve which avoids the foregoing drawbacks.

It is another object of the present invention to provide a valve of the character described which employs fewer and less costly parts and is easier to assemble than present day commercial and previously proposed pressurized container valves.

It is another object of the present invention to provide a valve of the character described in which the elastomeric member has a normally open through passageway, i.e., a passageway which is open in as-manufactured condition, so that this part can be made at a low cost, and in which, preferably, the elastomeric member is of uniform cross-sectional configuration as manufactured whereby it can be cut from a long tube of that configuration so that production, handling and assembly costs can be greatly reduced.

It is another object of the present invention to provide a valve of the character described in which the slit seal is effected by laterally pinching the aforesaid elastomeric member, to wit, the one with the normally open through passageway, thereby eliminating the need for cutting the slit after molding said member as an initially imperforate body.

It is another object of the present invention to provide a valve of the character described which eliminates the need for a separate spring for restoring the valve to its idle closed position and in lieu thereof utilizes a part of the elastomeric member for that purpose.

It is another object of the present invention to provide a valve of the character described which is easy to assemble and is reliable in operation.

It is another object of the present invention to provide a valve of the character described having a metered dispensing operation such that each time the valve is operated a predetermined amount of the pressurized contents of the container is discharged.

Other objects of the invention in part will be obvious and in part will be pointed out hereinafter.

The invention accordingly consists in the features of construction, combinations of elements, and arrangements of parts which will be exemplified in the valves hereinafter described and of which the scope of application will be indicated in the appended claims.

BRIEF DESCRIPTION OF THE DRAWINGS

In the accompanying drawings, in which are shown various possible embodiments of the invention, FIG. 1 is a perspective view of a pressurized container having at its upper end a dispensing valve constructed in accordance with the present invention;

FIG. 2 is an enlarged axial cross-sectional view through said valve, showing the same in idle closed position, said view being taken substantially along the line 2—2 of FIG. 1 at right angles to the plane of the pinch-formed slit;

FIG. 3 is a view similar to FIG. 2, but showing the valve in actuated open position;

FIG. 4 is a transverse cross-sectional view through the valve, the same being taken substantially along the line 4—4 of FIG. 4;

FIG. 5 is a view similar to FIG. 4 of a valve embodying a modified form of the present invention in that where FIG. 4 illustrates a round elastomeric tubing laterally pinched by an elliptical rigid-walled hole, FIG. 5 illustrates an elliptical elastomeric tubing laterally pinched by a round rigid-walled hole.

FIG. 6 is a transverse cross-sectional view through a valve of the present invention and of a pinching tool, the solid lines showing the valve and tool prior to pinching and the dot-and-dash lines showing the same elements after pinching; the original shapes of the elastomeric tubing and the rigid-walled hole are round but after pinching their shapes are elliptical;

FIG. 7 is a transverse cross-sectional view through the valve, the same being taken substantially along the line 7—7 of FIG. 2;

FIGS. 8 and 9 are views similar to FIGS. 2 and 3, respectively, of a modified valve embodying the present invention and having a metered dispensing operation; and FIG. 10 is a view similar to FIG. 2 of a valve embodying another modified form of the present invention.

DESCRIPTION OF THE PREFERRED EMBODIMENTS

In general the present invention is carried out by providing a rigid-walled hole for a container having pressurized contents comprising a product and a propellant.

The formulation of the contents is such that the material will be dispensed as a paste, a cream, a liquid stream, a foam, or a mist. The formulation is selected, as is known, to fulfill prescribed requirements, this being no part of the present invention. The rigid-walled hole can be a part of the container or a part of a valve assembly which part subsequently is mounted to close an opening in the container. The valve is composed of two essential parts, these being, firstly, an elastomeric member having a normally open through passageway and, secondly, a dispenser with a tubular stem. The rigid-walled opening has a finished configuration, i.e. configuration after manufacture is completed, which bears a certain relationship to the original, i.e. unstressed cross-sectional transverse configuration of the elastomeric member. This relationship is such that a single, i.e. one only, dimension of the finished opening is substantially smaller than the corresponding dimension of the original cross-section of the member. By "corresponding" is meant the same dimension after the hole and member are interengaged. The elastomeric member extends through the rigid-walled opening so that its opposite ends protrude therefrom. Due to the aforesaid relationship the opening laterally pinches the elastomeric member predominently from two opposed sides thereby collapsing the passageway of the member into an essentially planar slit which seals the opposite ends of the passageway from one another and thus seals the pressurized contents of the container from the ambient atmosphere. This arrangement enables the member to be made by simple one step molding techniques such as extrusion and the slit to be formed as an incident to assembly, rather than by cutting. It also enables the member to be made by severing it from a long length of tubing so that molding and handling of individual pieces is avoided. The stem of the tubular dispenser is sheathed in the passageway in the outwardly protruding end of the elastomeric member with the ingress end of the stem passageway above the lower ends of the abutting walls of the slit and, preferably, above the entire slit. When the dispenser is depressed the stem fully penetrates the slit and connects the interior of the container to the discharge opening of the stem permitting out-flow of the contents under the influence of the propellent. Concurrently, a portion of the dispenser, preferably a shoulder, engages and compresses the outwardly protruding end of the elastomeric member which stores up a force that biases the dispenser toward its idle valve-closed position. If the container is to be used in inverted positions the dip tube is omitted. If the container is to be used in erect positions the upper end of a dip tube is engaged to the downwardly protruding end of the elastomeric member.

Referring now in detail to the drawings, and, more particularly, to FIGS. 1–4 and 7, the reference numeral 10 denotes a pressurized container having at the upper end thereof a valve 12 constructed in accordance with and embodying the present invention.

The container 10 has a hollow interior defined by a sheet metal bottom wall (not shown), a cylindrical sheet metal side wall 14 and a domed sheet metal top wall 16. The container has for simplicity, been shown with the top wall and side wall formed in one piece; however it will be understood that an alternate widely used conventional construction can be employed wherein the cylindrical side wall has a hermetic side seam and wherein the bottom and top walls are joined to the side wall by hermetically interengaged flanges.

The valve 12 includes means defining a rigid-walled opening 18. Said means may be, as shown, a part 20 in one piece with the top wall or a part separate from the top wall and inserted in and hermetically joined to a hole in said top wall. More particularly, the domed top wall 16 converges upwardly to an aperture 22 to which the part 20 is joined, as shown in one-piece therewith. It is within the scope of the invention to have the lower end of the part 20 hermetically mechanically joined to the top wall 16 around the aperture 22.

The part 20 which is fabricated of a self-form-maintaining material, such as sheet metal, is of generally tubular shape. It includes a lower portion 24 which converges upwardly to a neck 26 that defines the rigid-walled opening 18. An upper portion 28 diverges upwardly away from the neck to a cylindrical top 30. In the illustrated valve 12, the neck 26 and, hence, the opening 18 are of elliptical finished configuration, the major axis of the ellipse being perpendicular to the plane of FIGS. 2 and 3. Thus the lower and upper portions 24, 28 are not symmetrical about their vertical axes, but, rather, converge and diverge more rapidly adjacent the ends of the minor axis of the ellipse and less rapidly adjacent the ends of the major axis.

The valve 12 further includes an elastomeric member 32 having a normally open through passageway 34, the member here constituting a short length of round tubing, cut, for example, from an end of a long length of round tubing. Suitable materials for the tubing are natural rubber and artificial rubber, e.g. Buna rubber. A soft elastomeric material is employed so that the member 32 can be pinched shut to convert the pinched portion of the passageway 34 into a slit 36 whose abutting faces are forced together to form a seal. By way of example an elastomeric material having a Shaw durometer of about 40 to about 70 performs satisfactorily. As just mentioned the opening 18 is of elliptical finished configuration and the tubing 32 is round when unstressed. The area of the finished opening is slightly less than the area of the material in a transverse unstressed cross-section of the tubing so that the opening compresses the tubing. Moreover, the width of the opening along the minor axis of the ellipse is substantially less than the external diameter of the tubing (preferably by an amount slightly exceeding the diameter of the passageway 34) while the length of the opening along the major axis of the ellipse is not substantially smaller than the external diameter of the tubing so that the tubing is laterally pinched at only two opposed sides thereof, rather than being circumferentially constricted, thus ensuring collapse of the normally open through passageway 34 into an essentially planar slit 36 within the opening 18. Because of the finished opening being smaller than the cross-sectional area of the material therein the walls of the slit are pressed firmly into sealing engagement, the excess material flowing radially outwardly as budges 38 into free spaces within the upper and lower portions 28, 24 of the part 20.

The neck 26 divides the tubing 32 into an upwardly protruding tubular column 40 above the slit and a downwardly protruding tubular column 42 below the slit. In these columns the through passageway 34 has its original unstressed round cross-section except immediately above and below the slit where the passageway merges into the slit.

It will be appreciated that the sealing slit 36 has been formed from a normally open unstressed through passageway simply by assembly of the tubing 32 in the opening 18, it having been unnecessary to first mold and then cut an imperforate elastomeric member. It will also be understood that because the member 32 can be cut off the end of a long length of tubing it can be made inexpensively and can be controlled until the moment of cut-off at which time it can already have been assembled. However, it is within the scope of the invention to use preformed members having normally open through passageways, such as grommets.

The tubing can be assembled with the part 20 in any suitable manner. For instance, the tubing can be forced endmost into the opening 18 for half the length of the tubing. Alternatively, the tubing can be stretched lengthwise to reduce its transverse dimensions, pulled half way through the opening 18 and then released. The tubing can be inserted in the part 20 from the outside of the container after the part 20 has been joined to the domed top wall 16 (or, as shown made in one piece with said top wall). If desired, the tubing can be inserted in the part 20 before said part has been joined to the top wall.

According to still another assembly method shown in FIG. 6, the neck 26' may initially be formed to the same shape as the tubing, both being shown as round in this figure where the initial configurations are indicated in solid lines. Thereafter the neck 26' is deformed at only two opposed sides, as with the aid of a plier-like crimping tool 44, to transform the initially round neck into the oval pinching shape shown in dot-and-dash lines in FIG. 6. Optionally, the neck may be constricted before it is crimped but this is not necessary since pinching the neck from two opposed sides reduces the area of the opening 18 and thereby ensures formation of a slit providing that the pinching is sufficient, as it is in accordance with the invention.

It is pointed out that the instant invention is not limited to originally round tubing and finished elliptical openings. An originally elliptical tubing 32" can be used with a finished circular opening 18" in a neck 26" as shown in FIG. 5 where a slit 36" likewise will be formed by collapsing the circular opening through unstressed passageway 34". The collapsing is caused by the lateral pinching action of the circular opening on the ends of the major axis of the ellipse. Another combination of shapes is an elliptical tubing and an elliptical opening, optionally with the major axes of the ellipses transverse and, preferably, perpendicular to one another. Nor are the shapes limited to round and elliptical; square and oblong also may be utilized. In general, the finished opening must have a single dimension substantially smaller than the corresponding original cross-section dimension of the tubing, sufficiently smaller to pinch the through passageway into a sealing slit. The other dimension of the opening does not have the same relationship to the other corresponding dimension of the tubing, being the same as, slightly smaller than, or larger than the other corresponding dimension of the tubing. Thereby it is assured that the original passageway is formed into a sealing slit intermediate its ends rather than into a restricted passageway as it would were an all-around substantially uniform circumferential constriction employed.

To aid in understanding the relationships of shapes, in FIGS. 4 and 5 the unstressed shapes of the tubings and through passageways have been shown in dotted lines.

The valve 12 includes, in addition to the rigid-walled opening 18 and the pinched tubing 32, a dispenser 46 having a circular head 48 and a pendant tubular stem 50. The dispenser is made of plastic or metal. The stem is telescopically received in the passageway in the upwardly protruding column 40, the fit being snug and slidable to permit relative axial movement. The lower end (tip) of the stem is wedge-shaped, tapering to an edge that is disposed above and in alignment with the slit. The length of the stem is about equal to the length of the passageway, from the slit to the upper end of the upwardly protruding column. The tip of the stem in idle position of the dispenser rests in the tapering part of the passageway immediately above the slit to keep the edge of the tip in alignment with the slit.

The undersurface of the head at the upper end of the stem forms an annular shoulder 52 directly above the top of the upwardly extending column 40. A skirt 54 depends from the outer edge of the shoulder and, with the stem 50, defines an annular groove 56 in which the upper half of the column 40 is located with clearance between the exterior side surface of the column and the outer side of the groove.

A bore 58 extends from an ingress end at the tip of the stem centrally up the stem and then to a restricted spray orifice 60 in the dispensing face 62 of the dispenser. If a paste, cream or foam is to be dispensed, the restricted orifice is omitted.

The circular head of the dispenser is axially slidable in the cylindrical top 30 of the tubular part 20. To captively retain the dispenser in said part the lower edge of the skirt has an outwardly extending stub flange 64 and the upper edge of the top 30 an inwardly extending stub flange 66.

The container further includes a dip tube 68 coupled to the lower end of the downwardly protruding column 42 so that the passageway of this column and the dip tube are connected in series. The dip tube is made of a flexible plastic such as polyethylene and its bottom end is on or near the bottom of the container, preferably adjacent the side wall thereof. The top of the dip tube is received in the bore of the column 42.

To provide a vapor tap the dip tube 68 is formed, as during extrusion, with an external configuration that supplies an external longitudinal depression, as shown a groove 70, when the tube is inserted in the elastomeric tubing 32. The groove thus forms a passageway connecting the vapor space 72 above the product in the container with the pocket 74 in the passageway in the column 42 immediately below the slit 36, accordingly allowing the pocket to be filled with the liquid phase of the contents. The dip tube is omitted if the container is to dispense in inverted position.

The idle position of the valve 12 is shown in FIG. 2. In it the entrance to the passageway at the lower end of the stem is above the lower end of the slit 36 which is exposed to the pressurized contents of the container. In particular in the specific valve illustrated the top of the stem is just above the upper end of the slit. Hence, the slit seals off the pressurized contents of the container from the dispenser.

To dispense the contents, the dispenser 46 is pressed down to the actuated position shown in FIG. 3. First the wedge-shaped tip of the stem enters the top of the slit. Then as the tip penetrates further the shoulder 52 will abut the top of the column 40 placing the same under axial compression. Eventually, the tip reaches the bottom of the slit, as shown in FIG. 3, whereupon the lower end of the passageway in the stem is exposed in the pocket 74, allowing the contents to be discharged in predetermined form from the dispensing face 62 so long as the dispenser is held down.

When the dispenser is released the compressed column 40 functioning as a spring will force the head 48 and stem 50 upwardly allowing the slit to reseal itself.

It will be seen that the column 50 bulges under compression and it is to accommodate this that the aforementioned clearance is provided between the skirt 54 and column 40 when the latter is not under axial compression.

The sequence of events as to entry of the tip into the slit and initiation of axial compression of the column 40 is not critical and will depend on such factors as the length of the slit parallel to the length of the stem, the amount of bulging and the amount of skirt-column clearance, as well as the limit of upward travel of the dispenser. It also will be noted that in the idle position shown in FIG. 2 there is clearance between the shoulder 52 and the top of the column 40. This is caused by the squeezing action of the slit on the wedge shaped sides of the tip of the stem after the column 40 has raised the dispenser sufficiently to relieve stress in said column.

The container can be filled in several ways, only some of which will be mentioned. One simple way is to complete assembly of the valve and mounting thereof on the container, except for the dispenser 46 and inturning of the flange 66. Then a hollow filling needle is penetrated through the slit, the container emptied of air and then filled through the needle, the needle withdrawn, the dispenser 46 emplaced and the flange 66 inturned. Another way is to fill before the tubing 18 is inserted into the neck 26. The steps would be to: pull a vacuum in the container, fill the container with a metered quantity of concentrate and propellant, force the tubing 32 into the neck 26 to form a seal, the tubing at this time being an end of the long length of the tubing, cut off the tubing to the proper length for the valve 12, if a dip tube is required forcing the tube through the slit and tubing to its proper location, emplacing the dispenser and inturning the flange 66. Still another way is to completely assemble the valve 12 in the part 20 with said part detached from the aperture 22, empty the container of air and fill it through said aperture, and then couple the part 20 to the aperture 22.

In FIGS. 8 and 9 there is shown a valve 74 embodying the foregoing novel features but modified to enable it to perform a metered dispensing operation, i.e. to discharge a predetermined amount of its contents each time the valve is operated. The valve 74 is like the valve 12 in that it includes a pinched section in an elastomeric tubing of originally normally open cross-section which section is adapted to be fully penetrated by the ingress opening of a stem. However, the elastomeric tubing is constricted below and spaced from the pinched section to form a metering compartment. The constricted section forms a restricted passageway leading from the metering compartment to the contents of the container, usually via a dip tube. The stem has a pendent extension aligned with the restricted passageway. The ingress opening and the pendent extension are so related to the pinched section and the constricted section that when the dispenser is depressed the pendent extension first will enter the restricted passageway to plug, i.e. block, the same, thereby isolating the metering compartment with a measured amount of the mixed product and propellant therein. Thereafter, while the restricted passageway remains blocked, the ingress opening emerges from the bottom end of the pinched section into the metering compartment to allow discharge of the contents of said compartment through the dispenser.

Specifically, the valve 74 constitutes a tubular part 76 through which an elastomeric tubing 78 axially extends. The tubing is round and has a through passageway 80 that is normally open, i.e. open in the original (unstressed) condition of the tubing.

The tubular part 76 is formed with an oval neck 82 the interior of which forms a rigid-walled oval opening 84. Said opening pinches the section of the tubing therein and collapses the same to form a pinched section, preferably a slit the opposed faces of which are forced against one another by the opening 84 to constitute a seal. An elastomeric column 86 extends upwardly from the pinched section into an outwardly flaring upper portion 88 of the part 76. The portion 88 terminates in a cylindrical top 90. The top 90 and upper half of the portion 88 are clear of the column 86.

Below and spaced from the neck 82 is a second neck 92 the interior of which forms a second opening 94. The opening 94 is approximately circular and constricts the section of the tubing therein. The constriction does not fully collapse the normally open passageway in the tubing to form a seal; it only constricts the tubing enough to form a restricted circular passageway 96. An elastomeric 98 extends downwardly from the constricted section into an outwardly flaring lower portion 100 of the part 76. The column 98 has the upper end of a dip tube 102 secured in its open passageway. The portion 104 of the tubing 78 between the upper pinched section and the lower restricted passageway 96 forms a metering compartment 106.

The valve 74 also includes a dispenser 108 having a circular head 110 and a pendent tubular stem 112. The dispenser is made of plastic or metal. The stem is telescopically received in a snug sliding fit in the passageway in the upwardly protruding column 86. The lower end (tip) of the stem is wedge-shaped. A bore 114 extends from an egress end 116 in the dispensing face of the head through the head and down the stem to an ingress end 118 in a face of the wedge-shaped tip.

A round extension 120 in one piece and in alignment with the stem depends from the tip of the stem. The tip of the extension is tapered. The longitudinal axis of the extension is aligned with the longitudinal axis of the stem 112. The round cross-section of said extension 120 is larger than the cross-section of the constricted passageway 96 whereby when the extension enters the passageway 96 it will block the same. Indeed the extension will expand said passageway so that it forms a seal therewith.

In the upper idle position of the dispenser 108 shown in FIG. 8, the tip of the extension 120 is above the upper end of the constricted passageway 96 which thus provides communication between the passageway 80 and the metering compartment 106. Hence in such idle position of the dispenser the metering compartment is, as shown in FIG. 8, filled with a mixture of the product and the propellent. However, as soon as the dispenser is depressed to force the extension 120 into the passageway 96 the metering compartment will be isolated from the hollow interior of the can.

The operation of the valve 74 only requires a brief description. As just mentioned, when the dispenser is idle, the metering compartment is filled with a mixture of the product and the propellent forced into the same from the passageway 80. At this time the ingress end 118 of the dispensing passageway 114 is above the sealing slit formed in the tubing 78 by the oval opening 84.

Upon initial downward movement of the dispenser 108, the tip of the extension 120 enters into the constricted passageway 96 so as to seal off the metering compartment from the contents of the can. Further downward movement of the dispensing head introduces the ingress end 118 into the metering compartment 106 whereupon the product will be forced through the dispensing passageway 114 and out the dispensing opening 116 by the pressure of the propellent in the compartment 106. The amount of the product dispensed will be that contained in the metering compartment, hence a metered amount of the product will be ejected.

It will be appreciated that the valve 74 can be used as a non-metered dispensing valve in accordance with the present invention by eliminating the second neck 92, the second opening 94 and the constricted passageway 96. With such modification, the valve 74 operates in essentially the same fashion as the valve 12, differing therefrom only in that the extension 120 is permanently within the sealed slit in contrast to the valve 12 wherein no part of the dispenser 46 is within the sealed slit or protrudes beneath it when the dispenser is in idle position.

In FIG. 10, there is shown a valve 130 which is constructed in a fashion similar to the valve 74, but does not include a metered dispensing function. The valve 130 also is essentially the same as the valve 12, except that the ingress opening to the stem faces laterally instead of downwardly, and except that the stem is provided with a dependent extension which in idle position of the dispenser extends through the pinch-formed slit in the elastomeric tubing of originally normally open cross-section.

In particular, the valve 130 includes a tubular part 132 through which an elastomeric tubing 136 axially extends. The tubing is round and has a through passageway 137, that is open is the original (unstressed) condition of the tubing. The tubular part 132 is formed with an oval neck 134, the interior of which provides a rigid-walled oval opening. Said opening pinches the section of the tubing disposed therein and collapses the same to form a slit, the opposed faces of which are forced against one another by the oval opening to constitute a seal. The tubing provides an elastomeric column 138 that extends upwardly from the pinched section into an outwardly flaring portion of the tubular part 132. Said outwardly flaring portion terminates in a cylindrical top 140. The top 140 and upper half of the outwardly flaring portion are clear of the column 138. An elastomeric column 142 extends downwardly from the pinched section of the tubing and receives the upper end of a dip tube 144.

A dispenser 146 is provided having a circular head and a pendant tubular stem 148. The head is slidable in the tube 140. The stem is telescopically received in a snug fit in the passageway in the upwardly protruding part 138 of the top 136. The lower end of the stem is wedge-shaped. A bore 150 extends from an egress end in the dispensing face of the head through the head and down the stem to a laterally facing egress end in a face of the wedge-shaped tip.

A round extension 152 in one piece and in alignment with the stem depends from the tip of the stem. The lower end of the extension is formed with an enlargement 154.

In the idle position of the dispenser 146, the wedge-shaped tip of stem 148 is located immediately above the pinch-formed slit in the tubing 136. Hence, the ingress end of the bore 150 is isolated from the pressurized contents of the can in the passageway 137. In this idle position, the extension 152 is disposed within the pinch-formed slit but does not provide a passageway through the slit, since the walls of the slit are in compressive engagement with the extension. The lower end of the extension terminates immediately below the bottom end of the slit and the enlargement 154 engages the innersurface of the tubing at the bottom end of the slit to prevent easy withdrawal of the dispenser.

To actuate the valve 130, the dispenser 146 is depressed forcing the stem 148 into the pinch-formed slit until the ingress end of the bore 150 is exposed within the lower portion 142 of the tubing 136, thus permitting the pressurized contents of the aerosol can led up through the dip tube 144 to enter the bore 150 and be discharged from the egress end of said bore. Depressing of the dispenser 146 compresses the column 138 so as to provide a biasing return force for the dispenser which shifts the dispenser to idle position when manual pressure thereon is released.

It thus will be seen that there have been provided valves which achieve several objects of the invention and which are well adapted to meet the conditions of practical use.

As various possible embodiments might be made of the above invention and as various changes might be made in the embodiments above set forth, it is to be understood that all matter herein described or shown in the accompanying drawings should be interpreted as illustrative and not in a limiting sense.

Having thus described the invention, there is claimed as new and desired to be secured by Letters Patent:

1. A method of making a dispensing valve for a closed container, said method comprising providing an elastomeric member having a through passageway which is open when the member is unstressed, with a rigid-walled hole laterally pinching an intermediate portion of said member so as to collapse the passageway into a seal which isolates the upper portion of the elastomeric member from the lower portion thereof, and then inserting into the upper portion of the member a tubular stem having a lower ingress opening, said ingress opening in idle position of the stem being disposed above the lower end of the seal.

2. A method is set forth in claim 1 wherein the hole initially does not laterally pinch the elastomeric member and in which after insertion of the elastomeric member in the hole, the hole is squeezed to perform said pinching.

3. A method is set forth in claim 1 wherein the hole initially is small enough to pinch the elastomeric member and in which the elastomeric member is introduced into such small hole.

References Cited
UNITED STATES PATENTS

| | | | |
|---|---|---|---|
| 2,328,863 | 9/1943 | Threm | 222—402.24 XR |
| 2,608,081 | 8/1952 | Morgan et al. | |
| 3,159,318 | 12/1964 | Green. | |
| 3,311,274 | 3/1967 | Green | 222—402.18 |
| 3,396,448 | 8/1968 | Kisling | 29—157.1 |
| 3,451,120 | 6/1969 | Herzig et al. | 29—157.1 XR |

CHARLIE T. MOON, Primary Examiner

U.S. Cl. X.R.

29—450, 516